United States Patent [19]

Cole

[11] 4,248,395
[45] Feb. 3, 1981

[54] AIRPLANE WING TRAILING-EDGE FLAP-MOUNTING MECHANISM

[75] Inventor: James B. Cole, Mercer Island, Wash.

[73] Assignee: The Boeing Company, Seattle, Wash.

[21] Appl. No.: 921,474

[22] Filed: Jul. 3, 1978

Related U.S. Application Data

[63] Continuation of Ser. No. 780,711, Mar. 24, 1977, abandoned, which is a continuation of Ser. No. 561,096, Mar. 24, 1975, abandoned.

[51] Int. Cl.$^2$ .............................................. B64C 9/20
[52] U.S. Cl. .................................................. 244/216
[58] Field of Search ........................ 244/216, 215, 213

[56] References Cited

U.S. PATENT DOCUMENTS

| | | | |
|---|---|---|---|
| 2,137,879 | 11/1938 | Ksoll | 244/216 |
| 2,289,704 | 7/1942 | Grant | 244/216 |
| 2,371,976 | 3/1945 | Patch | 244/216 |
| 2,404,956 | 7/1946 | Gouge | 244/216 |
| 3,614,028 | 10/1971 | Kleckner | 244/216 X |
| 3,853,289 | 12/1974 | Nevermann et al. | 244/216 |
| 3,985,319 | 10/1976 | Dean et al. | 244/216 |

FOREIGN PATENT DOCUMENTS

| | | | |
|---|---|---|---|
| 838625 | 3/1939 | France | 244/216 |
| 992365 | 10/1951 | France | 244/216 |
| 994382 | 11/1951 | France | 244/216 |
| 999786 | 2/1952 | France | 244/216 |
| 650914 | 3/1951 | United Kingdom | 244/216 |
| 805442 | 12/1958 | United Kingdom | 244/216 |

*Primary Examiner*—Barry L. Kelmachter
*Attorney, Agent, or Firm*—Robert W. Beach; Ward Brown

[57] ABSTRACT

Dual flap sections are supported by linkage, first for chordwise movement of the forward flap section rearwardly from the wing and for chordwise movement of the rear flap section rearwardly from the forward flap section, and then for tilting of the two flap sections conjointly to increase their angle of incidence relative to the wing. The forward flap section is supported by motion-amplifying compound linkage for effecting chordwise movement of the forward flap section relative to the wing, and the rear flap section is supported by motion-amplifying compound linkage from the forward flap section for effecting chordwise movement of the rear flap section relative to the forward flap section. Control mechanism for both motion-amplifying compound linkages is connected to the wing and is movable first to actuate the linkages primarily for shifting the two flap sections chordwise rearwardly from the wing and then primarily to tilt the foward and rear flap sections conjointly to increase their angle of incidence.

17 Claims, 10 Drawing Figures

AIRPLANE WING TRAILING-EDGE FLAP-MOUNTING MECHANISM

This is a continuation of application Ser. No. 780,771, filed Mar. 24, 1977, for Airplane Wing Trailing-Edge Flap-Mounting Mechanism, now abandoned, which was a continuation of application Ser. No. 561,096, filed Mar. 24, 1975, for Airplane Wing Trailing-Edge Flap-Mounting Mechanism, now abandoned.

BACKGROUND OF THE INVENTION

1. Field of the Invention

The present invention relates to mechanism for mounting flaps on the trailing edge of an airplane wing and for actuating such flaps to shift them rearwardly from the airplane wing and to alter their angle of incidence relative to the airplane wing.

2. Prior Art

Trailing edge flaps for airplane wings are conventional, but ordinarily such flaps have either been mounted by rather simple hinge mechanism on the trailing edge of the wing or have been shiftable chordwise of the wing by being mounted on rollers running on tracks as shown at 70 and 72 in FIGS. 4, 5 and 6 of U.S. Pat. No. 3,767,140 or by some special type of linkage which simultaneously shifts the flap chordwise and alters its angle of incidence relative to the wing as shown in FIGS. 11a, 11b and 11c of U.S. Pat. No. 2,137,879.

Supporting flaps by rollers running on a cam track has the disadvantage that the rollers may bind relative to the track as the wing deflects, which reduces the reliability of the flap-actuating mechanism. Moreover, the operation of rollers on tracks can produce highly concentrated loads which could result in localized failure of the supporting track. Moreover, the track and roller design requires expensive machining for the tracks and fittings and precision heat-treating. With track and roller type of support it is difficult to provide compact and simple actuating mechanism.

Where linkages have been used to support flaps, the range of movement of which the flaps are capable is limited, and it is difficult to obtain desired types of flap movement.

SUMMARY OF THE INVENTION

It is a principal object of the present invention to provide linkage which will support and guide one or more wing trailing-edge flap sections for extended essentially chordwise movement rearwardly from the wing, followed by tilting to increase the flap angle of incidence.

It is a further object to provide such linkage which will incorporate rotary joints and self-aligning bearings that can accommodate readily to deflections of the wing without binding. Also, it is an object to provide such linkage which will be rugged and reliable and cannot easily be rendered inoperative by accumulation of sand, dirt, ice or other foreign material.

Another object is to provide such linkage which can support one or more flap sections from the trailing portion of a wing by mechanism which will not have excessive stress concentrations.

It is also an object to utilize linkage for supporting one or more flap sections which can be manufactured economically.

Flap-mounting mechanism of the present invention also has the advantage of being of comparatively simple construction and of light weight.

The foregoing objects can be accomplished by utilizing motion-amplifying linkage for supporting one or more flap sections connected in series so that actuation of one motion-amplifying linkage will effect corresponding actuation of the other motion-amplifying linkage or linkages to effect corresponding movement of their respective flap sections.

DETAILED DESCRIPTION

Figure 3:
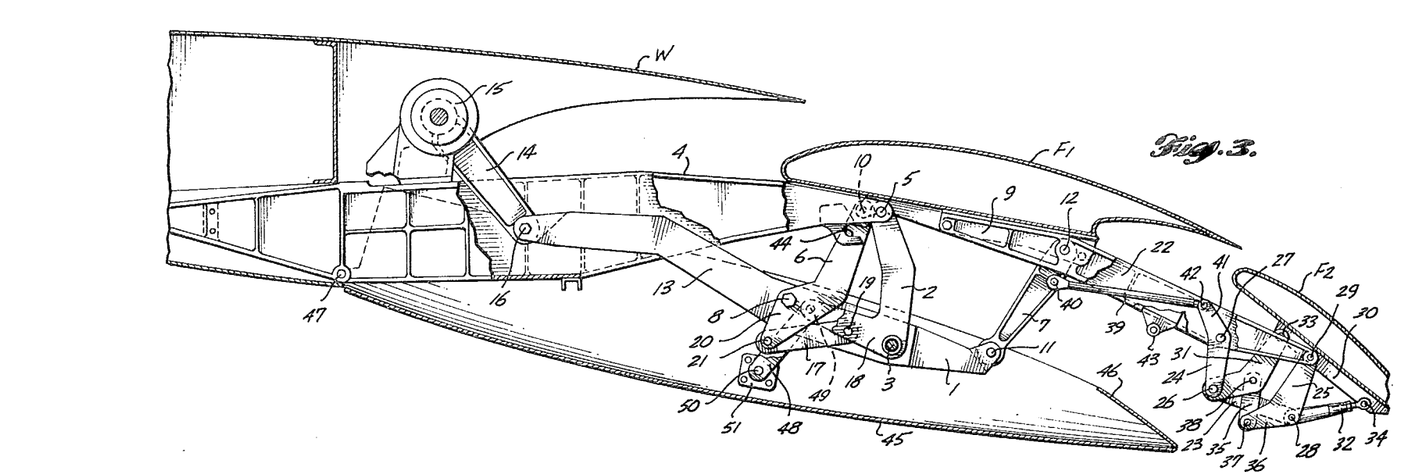
Figure 4:
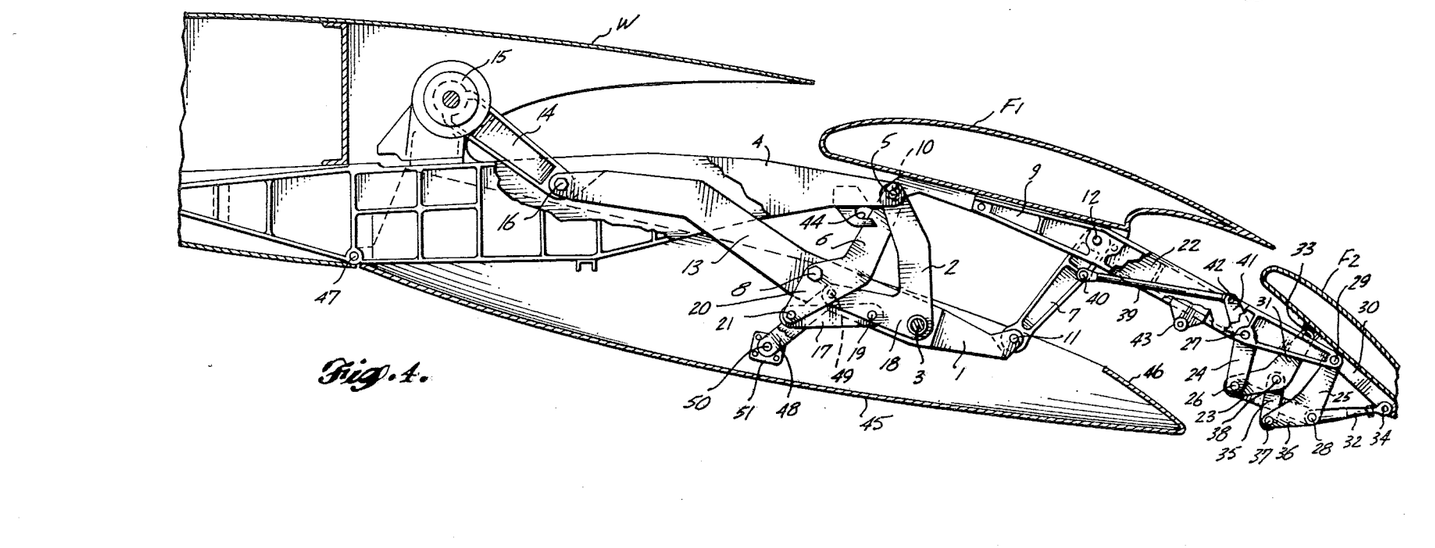

The present invention can be applied to airplane wing trailing-edge flap installations having flaps of different types. The invention is illustrated as being applied to a plural section flap including a forward flap section F1 and a rear flap section F2 extending along the trailing edge of the wing W. The mounting mechanism of the present invention supports the flap sections for coordinated movement between the forward contracted condition of FIG. 1 in which the flap sections will be disposed during cruising of the airplane and the maximum rearwardly extended and downwardly tilted condition of FIG. 5 in which the flap sections are disposed during landing. FIGS. 2, 3 and 4 show intermediate positions of the flap sections.

Figure 1:
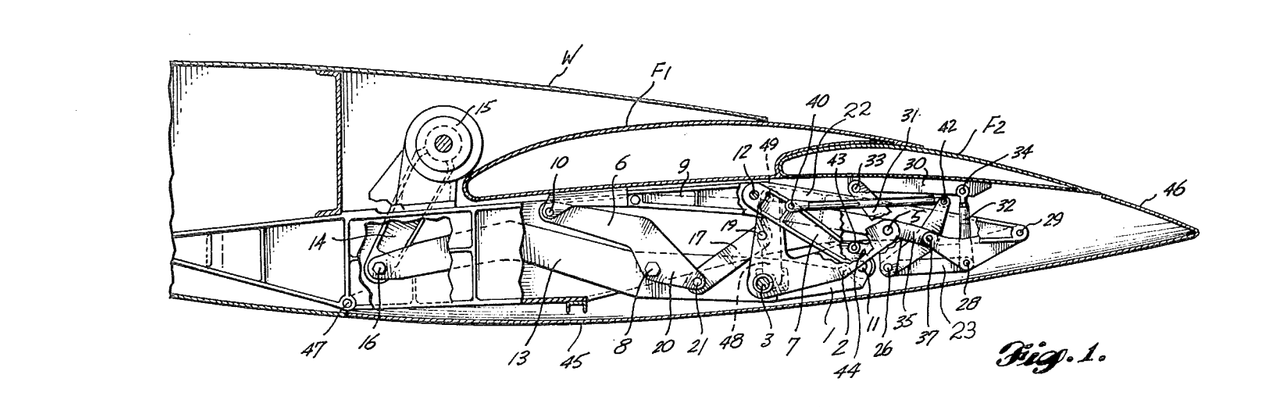
FIGS. 1, 2, 3, 4 and 5 are vertical longitudinal sections through a representative airplane wing trailing-edge flap assembly, showing parts in different relative positions.
Figure 2:
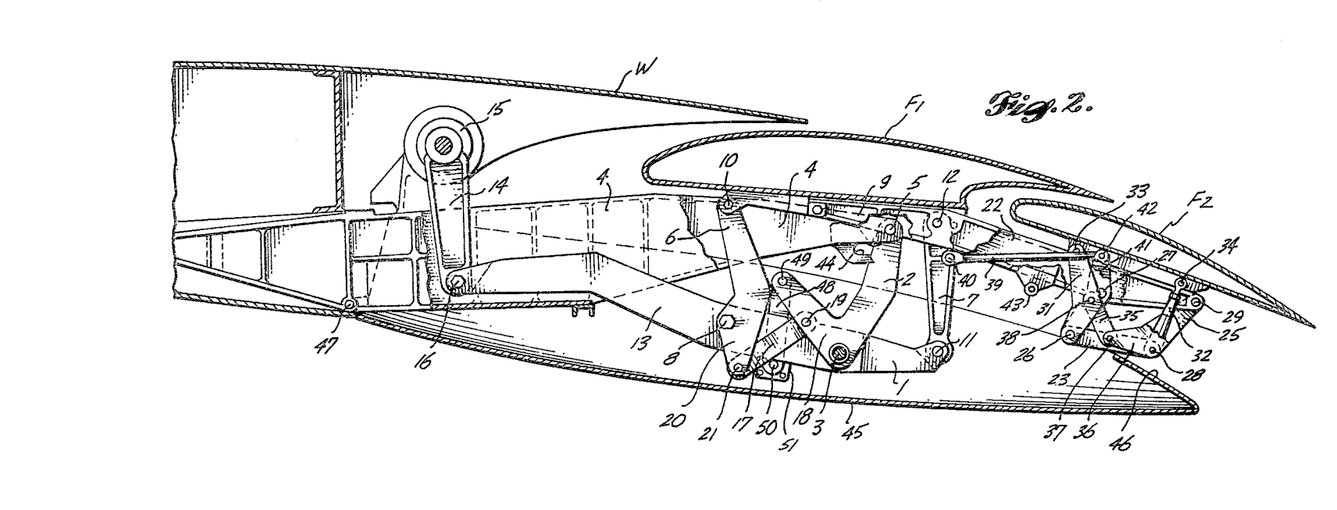

In their positions of FIG. 2, the flap sections have been moved chordwise rearwardly to some extent from the positions of FIG. 1. In the FIG. 2 positions, the flap sections will have increased the effective wing area to some extent with little increase in wing drag. With the flap sections in the positions of FIG. 3, the effective wing area will have been increased considerably without substantial increase in wing drag. The parts may be disposed in approximately this position for take-off of the airplane. With the flaps in the position of FIG. 4, the expansion of the wing area is maximum and the drag will have been increased to some extent, but the lift will not be maximum. Between the positions of the flap sections shown in FIG. 4 and their positions shown in FIG. 5, such flap sections have been tilted relative to the wing W to higher angles of incidence so as to provide the maximum lift configuration of the flap assembly for use during landing.

The forward flap section F1 is supported from the wing W by motion-amplifying compound linkage, and the rear flap section F2 is supported from the forward flap section F1 by motion-amplifying compound linkage. The purpose of such linkage in each instance is to effect chordwise movement of the supported flap section relative to the structure which supports it. In the case of the forward flap section F1, such chordwise movement will be relative to the wing W. With respect to the rear flap section F2, the chordwise movement will be with respect to the forward flap section F1. Since the rear flap section F2 is supported from the forward flap section F1, the rear flap section F2 will be moved chordwise rearward with respect to the wing W by chordwise movement of the forward flap section F1 relative to the wing, and, in addition, will be moved chordwise relative to the forward flap section F1 and the wing W by the action of the motion-amplifying compound linkage supporting the rear flap section F2 from the forward flap section F1.

Figure 7:
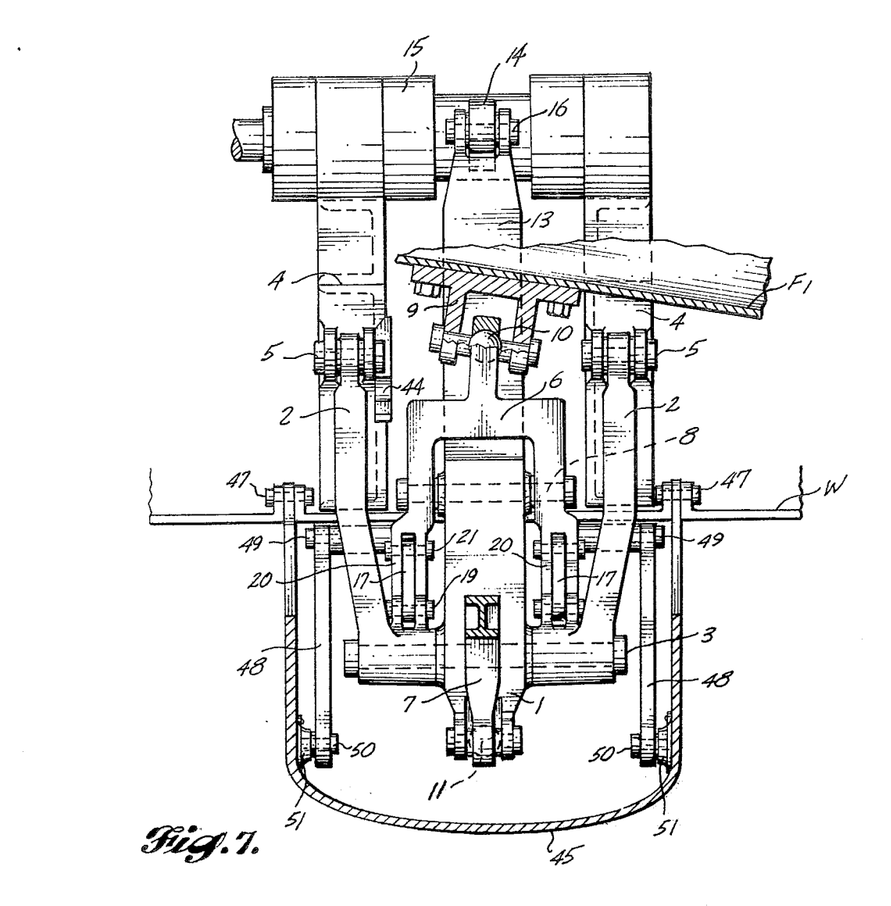
FIG. 7 is a transverse section through a mounting unit taken on line 7—7 of FIG. 5.

The motion-amplifying compound linkage for supporting the flap section F1 includes the elongated carrier bar 1, located with its length generally horizontal and extending fore and aft of the airplane. Such carrier bar is supported between its ends from the structure of wing W by a carrier-supporting line 2 having its swinging end connected to the carrier bar 1 by a pivot 3. This link includes parallel elements, as shown in FIG. 7, for stability. The upper end of the carrier supporting link is attached by a pivot 5 to the aft end of a cantilever beam 4 projecting rearwardly from the wing W below the forward flap section F1. The flap section F1 is mounted on the carrier bar 1 by substantially parallel links 6 and 7 projecting upward from the carrier bar to the bottom of the flaps section, so that they are located at the same side of the carrier bar as the carrier supporting link 2, both linkages being above the carrier bar.

The links 6 and 7 are located at opposite sides respectively of the link 2. The link 6 swings relative to the carrier bar 1 about the axis of pivot 8 connecting the lower end of link 6 to the carrier bar. The swinging upper end of such link is connected to a structural portion 9 of the forward flap section F1 by a pivot 10. The lower end of link 7 rearward of link 2 is connected to the aft end of carrier bar 1 by a pivot 11. The swinging upper end of link 7 is connected to the structure 9 of the forward flap section F1 by a pivot 12. Control of the movement of the motion-amplifying compound linkage composed of carrier bar 1, carrier supporting link 2 supporting such carrier bar from the wing W, and flap section-supporting links 6 and 7 supporting the forward flap section of F1 from the carrier bar, is effected by longitudinal fore and aft reciprocation and tilting of the carrier bar 1. Such reciprocation and tilting is accomplished by attaching control mechanism to a lever arm extension 13 riged with the carrier bar 1 and extending forward from the carrier bar 1 to which the links 2, 6 and 7 are attached a substantial distance beyond the flap F1.

The control mechanism for the motion-amplifying compound linkage is illustrated as a crank arm or control arm 14 projecting radially from a rotary actuator 15 rotatable about a lateral axis extending substantially spanwise of the wing. The crank arm 14 and carrier-supporting link 2 form substantially parallel links supporting carrier bar 1 and its lever arm extension 13 in some swung positions of the crank arm shown in FIGS. 1, 2 and 3. Such rotary actuator should be capable of swinging the crank arm 14 through an angle of 100° to 120° between the positions of FIG. 1 and FIG. 5, and may be either fluid-actuated or electrically driven. The swinging end of such control crank arm is connected to the forward end of the carrier bar lever arm extension 13 by a pivot 16. As the control crank arm 14 is swung by the rotary actuator 15 between the position shown in FIG. 1 and the position shown in FIG. 3, the carrier bar 1 will be first principally reciprocated lengthwise and then as the crank arm is swung between the position of FIG. 3 and the position of FIG. 5 the carrier bar will be principally swung relative to link 2 about the axis of pivot 3.

The swinging of carrier-supporting link 2 about pivot 3 relative to the carrier bar 1 and the swinging of parallel links 6 and 7 relative to such carrier bar about pivots 8 and 11, respectively, is coordinated by connecting the link 2 with one of links 6 or 7 by a coordinating link 17. The aft end of this link is connected by a pivot 19 to an arm 18 projecting forward from the lower end of link 2. Link 2 and arm 18 form a bell crank. The forward end of link 17 is connected to a downwardly projecting extension 20 of link 6 by a pivot 21. Swinging of carrier-supporting link 2 about pivot 3 in a clockwise direction relative to carrier bar 1 will always be accompanied by coordinated swinging of links 6 and 7 about pivots 8 and 11, respectively, in a counterclockwise direction relative to the carrier bar because of the interconnection of the two link systems by the link 17, the bell crank arm 18 and the extension 20. Such swinging of carrier-supporting link 2 is effected by reciprocation of carrier bar 1 by control mechanism 13, 14, 15.

The function of the motion-amplifying compound linkage formed by the carrier bar 1, the first link means including link 2 supporting the carrier bar from the cantilever wing beam 4 and crank arm or control arm 14 supporting the forward end of the carrier bar extension 13, and the second link means including parallel links 6 and 7 supporting the forward flap section F1 from the carrier bar 1, is to effect generally linear chordwise reciprocation of such forward flap section relative to the wing W and to alter the angle of incidence of such flap section relative to the wing. As the control or crank arm 14 is swung in the counterclockwise direction about the axis of rotary actuator 15 between the positions of FIG. 1 and FIG. 4 through an angle of approximately 90°, longitudinal reciprocation of the carrier bar 1 effected by such arm movement will swing link 2 in the counterclockwise direction about is pivot 5 relative to the wing structure between the positions of FIGS. 1 and 4.

The swinging end of crank arm or control arm 14, carrying pivot 16 connecting such arm to the forward extension 13 of the carrier bar 1, and the swinging end of link 2 will move in an upwardly concave arc, but the movement of bar 1 will be principally fore and aft, that is, substantially lengthwise during swinging of the crank arm between the positions of FIG. 1 and FIG. 3. The lengthwise displacement of carrier bar 1 rearward relative to wing W will carry the forward flap section F1 correspondingly rearward relative to the wing. As the link 2 is swung in the counterclockwise direction about pivot 5, it also will swing in the counterclockwise direction relative to the carrier bar 1 about pivot 3. Such swinging of the link 2 relative to the carrier bar effects swinging of links 6 and 7 relative to the carrier bar in a clockwise direction because of the interconnection between the link means through link 17, bell crank arm 18 and extension 20. The flap section F1 connected to the links 6 and 7 by pivots 10 and 12 will be shifted chordwise rearward relative to the carrier bar 1 in a downwardly concave arc. Because arm 14 and link 2 guide carrier bar 1 to move in an upwardly concave arc relative to beam 4 and because links 6 and 7 cause flap section F1 to move in a downwardly concave arc relative to such carrier bar, the actual translatory chordwise movement of the flap section will be substantially linear between the positions of FIGS. 1 and 3.

By effecting rearward reciprocation of the carrier bar 1 relative to the wing W, the forward flap section F1 will be shifted chordwise rearward relative to the wing through a distance approximately twice as great as the distance that carrier bar 1 is shifted relative to the wing by swinging of arm 14, because the lengths of links 6 and 7 between their pivots 8, 10 and 11, 12, respectively, is approximately the same as the effective length of arm 14 between its pivot 16 and the rotative axis of actuator 15 and the effective length of link 2 between its pivots 3 and 5. The relative lengths of the links can depart from precise equality and the angles of the links can be altered from exact parallelism to obtain precisely the movement desired.

Figure 5:
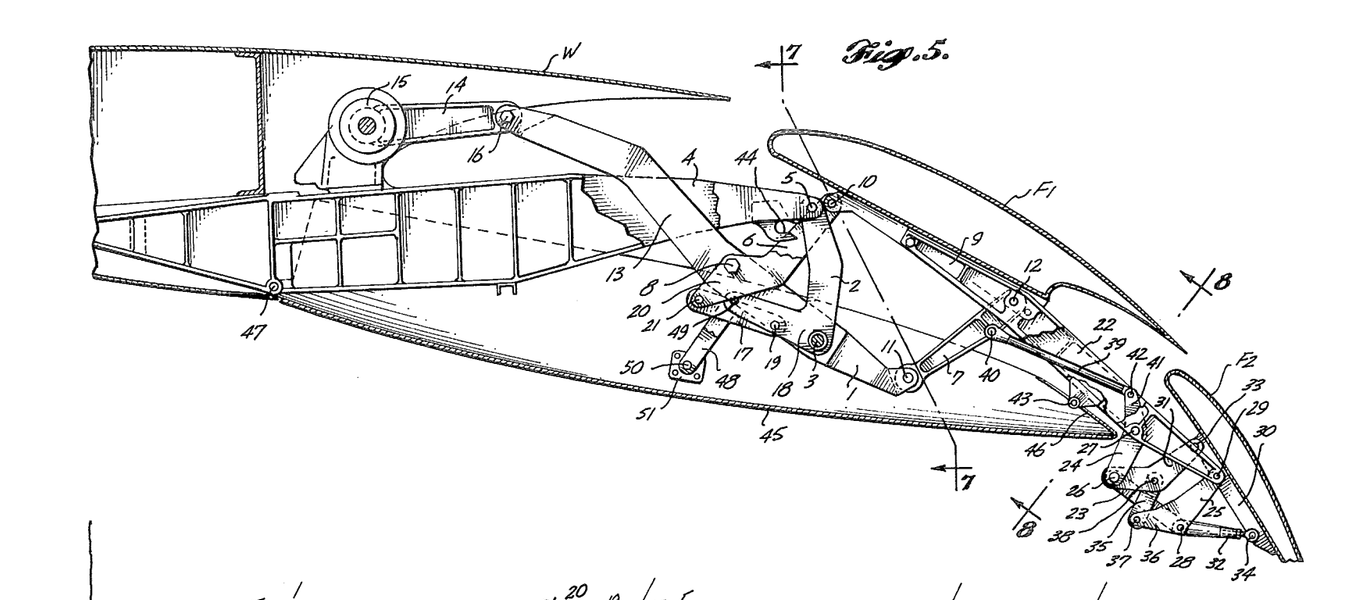

When control crank arm 14 is swung in a counterclockwise direction beyond the position shown in FIG. 3 and through an angle of approximately 45° between the positions of FIGS. 4 and 5, the crank arm will swing from one angular relationship to lever arm 13 through a position substantially aligned with such lever arm to an opposite angular relationship to the lever arm, during which movement pivot 16 will pass across a line joining the rotative axis of rotary actuator 15 and lever arm pivot 3, so that such swinging of the control crank arm will effect minimum longitudinal reciprocation of the carrier bar chordwise of the airplane wing and, instead, will primarily effect swinging of the carrier bar 1 about pivot 3. Such swinging of the carrier bar will not effect appreciable swinging of link 2 about its pivot 5, relative to the carrier bar 3. Forward flap section F1 will be swung generally correspondingly, because pivot 3 is located substantially centrally between pivots 8 and 11 that connect flap-supporting links 6 and 7 to the carrier bar. Such swinging of the carrier bar will therefore primarily alter the angle of incidence of the flap section F1 relative to the wing W rather than shifting such flap section chordwise appreciably farther rearwardly relative to the wing.

As the rotary actuator 15 is driven to swing the control crank arm 14 in the opposite, clockwise direction from the position of FIG. 5 toward the position of FIG. 1, the first effect of such arm swinging will be to move the arm from the position of FIG. 5 to the position of FIG. 4, during which movement the carrier bar 1,13 will be swung in a counterclockwise direction about pivot 3 of link 2 to swing the flap section F1 correspondingly, and thereby decrease its angle of incidence relative to the wing W. As the actuator 15 continues to be rotated for swinging control crank arm 14 farther in a clockwise direction from the position of FIG. 4 toward the position of FIG. 1, the tilting of carrier arm 1 will be minimal, and its principal movement will be lengthwise forward to effect swinging of the supporting link 2 about its pivot 5 to produce similar clockwise swinging of such link relative to the carrier bar 1. Clockwise swinging of such link relative to the carrier bar will effect coordinated swinging of the links 6 and 7 supporting the flap section F1 from the carrier bar in a counterclockwise direction relative to such carrier bar because of the interconnection between link 2 supporting the carrier bar and links 6 and 7 supporting the flap section from the carrier bar by the link 17, the bell crank arm 18, and the extension 20 of link 6.

As the carrier bar is being shifted forwardly by swinging of control crank arm 14 in the clockwise direction, links 6 and 7 swing counterclockwise relative to the carrier bar 1 thereby shifting flap section F1 chordwise forwardly relative to the carrier bar, and such swinging of links 6 and 7 will effect chordwise forward movement of the flap section F1 at approximately twice the speed of forward movement of the carrier bar 1 relative to wing W, so that the flap section and carrier bar will move progressively from the positions of FIG. 4, through the positions of FIGS. 3 and 2, to the most forward positions shown in FIG. 1 corresponding to cruise condition of the wing.

In a plural flap section installation, a rear flap section F2 can be supported from the forward flap section F1 in a manner generally similar to that in which the forward flap section is supported relative to the wing W as described above. The cantilever beam 22 can project rearwardly from the forward flap section F1 to serve as a support for the rear flap section F2. A secondary elongated carrier bar 23 with its length extending fore and aft is supported from the trailing portion of the cantilever beam 22 by substantially parallel links 24 and 25. The forward link 24 is connected to the forward end of the secondary carrier bar 23 by a pivot 26, and the upper portion of such link is connected to the cantilever beam 22 by a pivot 27. A swinging portion of the aft link 25 is secured by a pivot 28 to the rear portion of the secondary carrier bar 23. The upper end of such link is attached to the trailing end of the cantilever beam 22 by a pivot 29.

A structural portion 30 of the rear flap section F2 is supported by generally parallel links 31 and 32 from the secondary carrier bar 23. The lower end of link 31 can be attached to the carrier bar 23 by the same pivot 26 as connects the lower end of link 24 to the carrier bar. The upper end of link 31 is connected to the structural member 30 of flap section F2 by pivot 33. Similarly, one end of link 32 can be attached to the secondary carrier bar 23 by the same pivot 28 as connects the lower end of link 25 to such carrier bar. The upper end of link 32 is connected by pivot 34 to the structural member 30 of the rear flap section F2.

It will be noted that, as in the motion-amplifying compound linkage supporting the forward flap section F1, the two link means of the motion-amplifying compound linkage supporting the rear flap section F2 from the cantilever beam 22 are also located at the same side of the secondary carrier bar 23. In order to coordinate swinging of the links 31 and 32 supporting the flap section F2 relative to swinging of the links 24 and 25 supporting the secondary carrier bar 23, the link 31 of the first link means is connected to the link 25 of the second link means by a coordinating link 35. One end of this coordinating link is connected to a forward extension 36 of link 25 by a pivot 37. A line connecting the pivots 28 and 37 is at a substantial angle to the extension of a line passing through pivots 29 and 28, so that the extension 36 substantially forms a bell crank with link 25.

The other end of the coordinating link 35 is connected to a knee on link 31 by a pivot 38. Such coordinating link effects swinging of links 31 and 32 relative to secondary carrier bar 23 in the direction opposite swinging of links 24 and 25 relative to such carrier bar. When the parts are moving from their relative positions of FIG. 1 through their positions of FIG. 2, to their positions of FIG. 3, the links 24 and 25 are swinging in a counterclockwise direction about their pivots 26 and 28, respectively, relative to the carrier bar 23. The movement of coordinating link 35 effected by such swinging of link 25 relative to that carrier bar causes link 31 and in turn link 32, to swing in a clockwise direction relative to the carrier bar.

Swinging of links 31 and 32 relative to carrier bar 23 in a clockwise direction while links 24 and 25 are swinging relative to such carrier bar in a conterclockwise direction produces a motion-amplifying movement of the rear flap section F2 relative to the cantilever beam 22. Since link 31 between its pivots 26 and 33 and link 32 between its pivots 28 and 34 are approximately of the same length as the link 24 between is pivots 26 and 27 and the link 25 between its pivots 28 and 29, the coordinated swinging of the links will effect chordwise movement of rear flap section F2 relative to the cantilever beam 22 and the forward flap section F1 approximately twice as great as the movement of secondary carrier bar 23 relative to such beam.

Not only are the motions of link means 24,25 and link means 31,32 coordinated with each other, but the motions of the secondary motion-amplifying compound linkage supporting the rear flap section F2 are controlled by the movement of the primary motion-amplifying compound linkage supporting the forward flap section F1 from the wing cantilever beam 4. Such control of the movement of the secondary motion-amplifying compound linkage from flap section F1 is transmitted by a secondary control link 39 having its forward end connected by pivot 40 to link 7 of the primary motion-amplifying compound linkage. The aft end of secondary control link 39 is connected to an upward extension 41 of link 24 by pivot 42. Consequently, whenever link 7 is swung relative to forward flap section F1 and cantilever beam 22, link 39 will effect corresponding swinging of link 24 relative to such beam. Swinging of link 24 will effect corresponding swinging of link 25 because both of such links are connected to the secondary carrier bar 23, and swinging of link 25 relative to such carrier bar will effect corresponding swinging of links 31 and 32 relative to such bar through coordinating link 35, as described above.

Swinging of link 7 relative to forward flap section F1 and auxiliary beam 22 occurs principally during movement of the linkage between the positions of FIG. 1 through the position of FIG. 2 to the position of FIG. 3. Very little relative movement occurs between link 7 and auxiliary beam 22 during movement of the parts from their positions of FIG. 3, through their positions of FIG. 4, to their positions of FIG. 5. Consequently, secondary control link 39 will effect movement of the secondary motion-amplifying compound linkage, supporting the rear flap section F2 from the beam 22, primarily during movement of the parts from the positions of FIG. 1 through the positions of FIG. 2, to the positions of FIG. 3, and there will be little or no movement of the secondary motion-amplifying compound linkage and rear flap section F2 relative to the auxiliary beam 22 and the forward flap section F1 during movement of the parts between the positions of FIG. 3 and FIG. 5.

As has been discussed above, the principal movement of the forward flap section F1 between the position of FIG. 3 and the position of FIG. 5, is to increase the angle of incidence of such flap section relative to the wing W. During movement of the parts between their positions of FIG. 3 and their positions of FIG. 5, the rear flap section F2 will not move appreciably relative to the forward flap section F1, but such flap sections will move substantially conjointly to vary substantially correspondingly the angle of incidence of both flap sections relative to the wing W. Such angle of incidence will increase during movement of the parts from the positions of FIG. 3, through the positions of FIG. 4, to the positions of FIG. 5; and the angle of incidence of the flap sections relative to the wing W will decrease as the parts are moved from their positions of FIG. 5, through their positions of FIG. 4, to their positions of FIG. 3.

Figure 6:
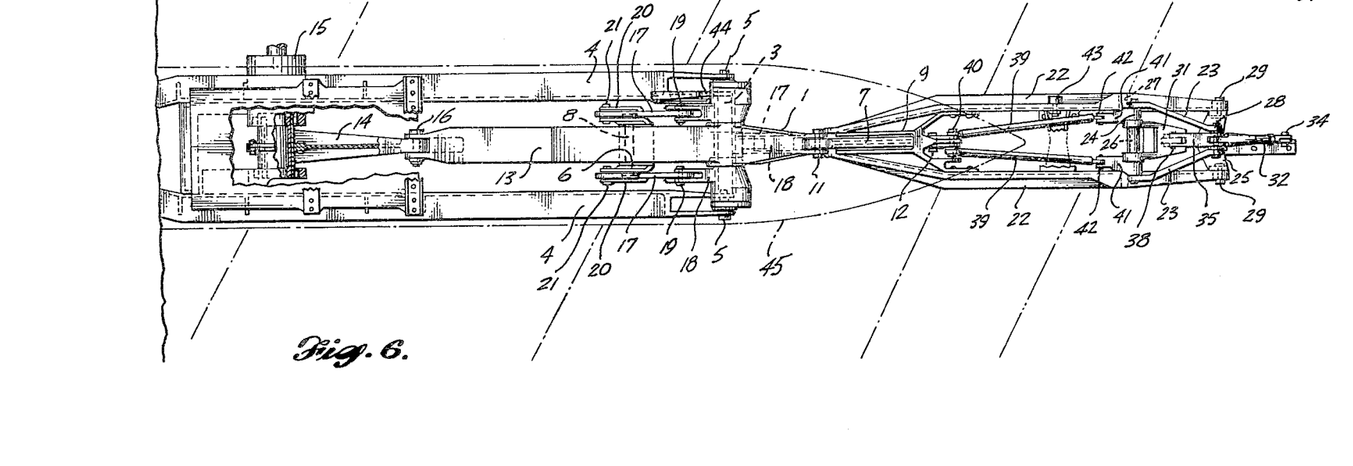
FIG. 6 is a bottom plan of flap-mounting mechanism in the condition shown in FIG. 5.
Figures 9, 10:
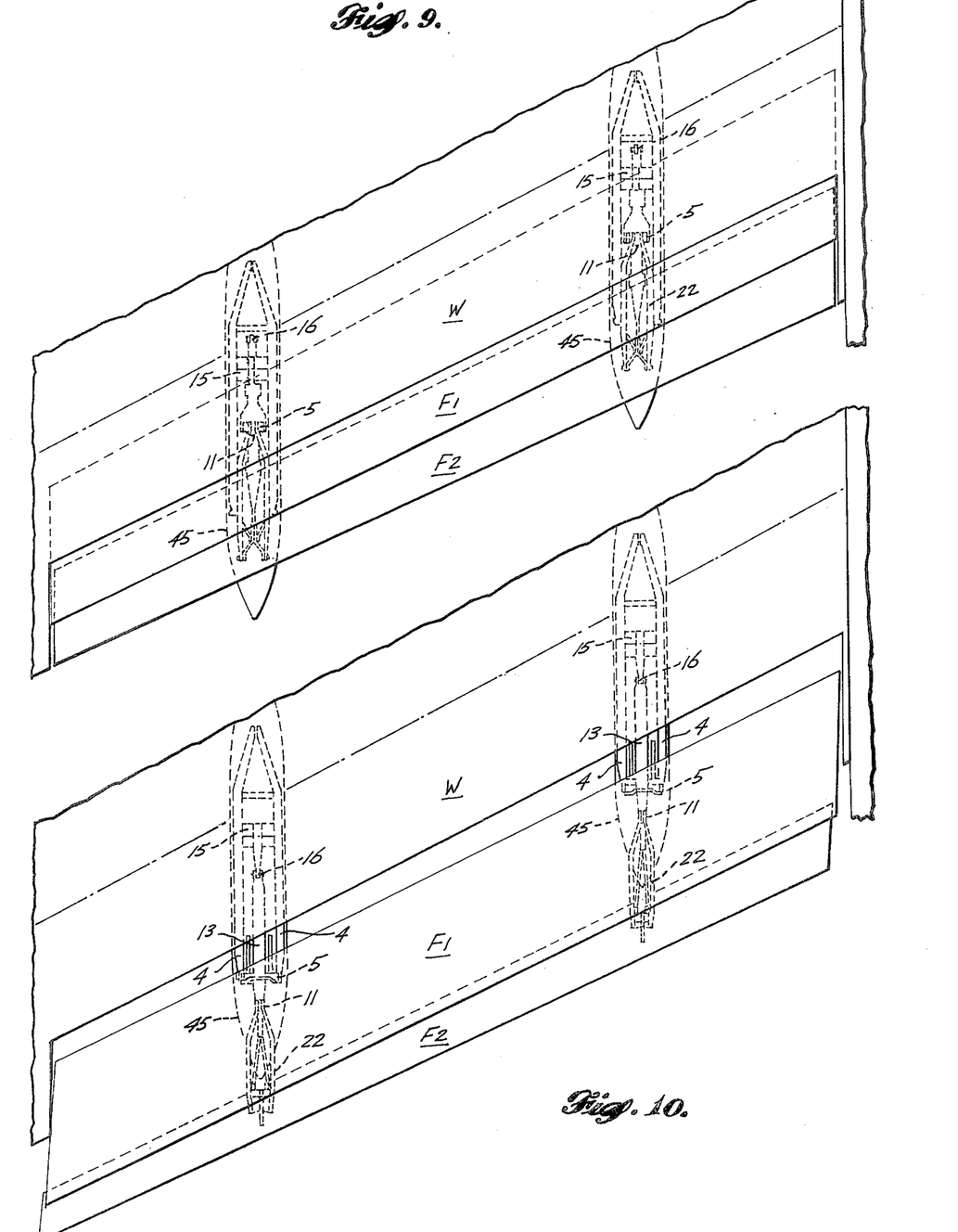
FIGS. 9 and 10 are plans of a sweptback wing showing flap sections in different positions.

When the flap-mounting mechanism of this invention is utilized for supporting a flap section or flap sections on a swept-back wing trailing edge as shown in FIGS. 9 and 10, the supporting locations for the link mechanisms are spaced spanwise of the wing as indicated in broken lines in those figures. FIG. 9 shows the flap sections F1 and F2 in their retracted positions of FIG. 1. In FIG. 10 the flap sections are in their rearwardly translated and downwardly tilted positions of FIG. 5. Because a line connecting corresponding pivots of the two spanwise spaced mounting mechanisms would not be perpendicular to the translatory direction of movement of the flap sections, such flap sections will swing in a somewhat skewed relationship relative to the wing W. The dot-dash lines in FIG. 6 represent the sweepback angle of the wing and flap sections relative to the axes of pivots 15, 8, 40 and 42.

Figure 8:
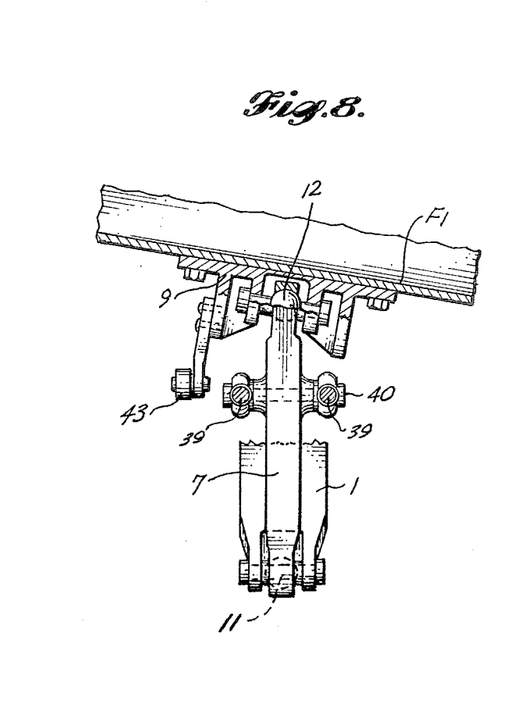
FIG. 8 is a transverse section taken on line 8—8 of FIG. 5.

Link 6, which is connected through coordinating link 17 to bell crank 2, 18, is mounted on carrier bar 1 by a trunnion pivot 8, as shown in FIG. 7, so that movement of link 6 is positively controlled. In order to prevent binding during skewed movement of the flap means relative to the wing, FIG. 7 shows that pivot 10 connecting link 6 to flap section F1 is of the ball joint type, and FIG. 8 shows that pivots 11 and 12 connecting the ends of link 7 to the carrier bar 1 and flap section F1, respectively, are of the ball joint type, so that the flap section F1 can cock relative to link 6, and link 7 can cock relative to both carrier bar 1 and flap section F1. Correspondingly, in the secondary motion-amplifying compound linkage supporting the rear flap section F2, pivot 26 is of the trunnion type, as shown in FIG. 6, and pivots 28, 33 and 34 are of the ball joint type.

During high-speed flight, it is desirable to support the auxiliary cantilever beam 22 directly from the wing cantilever beam 4 instead of indirectly through the medium of the primary motion-amplifying compound linkage, including links 2, 14, 6 and 7. For this purpose a roller 43 is mounted on the auxiliary beam 22 for engagement with the hook 44 when the primary motion-amplifying compound linkage parts are in the positions shown in FIG. 1. These elements can best be seen in FIGS. 4, 5, 7 and 8. The roller and hook engagement will transmit principally vertical loads between the flap sections F1 and F2 and the cantilever beam 4 mounted rigidly on the wing W.

In order to minimize drag on the airplane wing when it is in the cruise condition of FIG. 1, it is preferred that the flap-supporting and flap-actuating linkage be enclosed. For this purpose a bottom cowling section 45 is shown having an upper surface trailing edge portion 46 that can be disposed in faired relationship with the upper surfaces of the forward flap section F1 and the rearward flap section F2 in the contracted condition shown in FIG. 1. It is, however, necessary to move such cowling outwardly from the position shown in FIG. 1 in order to afford room for movement of the motion-amplifying compound linkages and the flap sections F1 and F2 from the position of FIG. 1 through the positions of FIGS. 2, 3 and 4, to the position of FIG. 5, as described above. Consequently, the forward portion of the cowling 45 is connected by a pivot 47 to the wing structure, about the axis of which pivot the cowling can swing downward through the position of FIG. 2 to the position shown in FIGS. 3, 4 and 5.

Swinging of the cowling 45 between its upper position of FIG. 1 and its lower position of FIGS. 3, 4 and 5 about its pivot 47 is accomplished by swinging of link 5 relative to the cantilever beam 4. The mechanism for effecting such swinging includes an upright link 48 having its upper end connected by a pivot 49 to the bell crank arm 18 of link 2. The lower end of such link is connected by pivot 50 to a fitting 51 attached to the cowling 45. As the link 2 swings from the position of FIG. 1 in a counterclockwise direction relative to the beam 4, the end of upper bell crank arm 18 will swing downward, pushing link 48, and consequently fitting 51, downward. Such movement will swing cowling 45 downward about its pivot 47, and such cowling will remain practically stationary in the position shown in FIGS. 3, 4 and 5 during the principal expansion and deflection downward of the flap assembly.

The cowling 45 will remain in its lowered position of FIGS. 3, 4 and 5 as the flap assembly is retracted from the position of FIG. 5, through the position of FIG. 4, to the position of FIG. 3. Further movement of the flap assembly toward the completely contracted condition of FIG. 1 will be accompanied by clockwise swinging of link 2 relative to beam 4, so that the forward end of the bell crank arm 18 will move upward to pull link 48 upward correspondingly, and thus move fitting 51 and cowling 45 back through the position of FIG. 2 to the position of FIG. 1.

I claim:

1. Mounting mechanism for an airplane wing trailing-edge flap, comprising a cantilever supporting beam projecting rearwardly from the airplane wing, first link means pivotally connected to said beam, a carrier member elongated fore and aft and having a pivotal connection at a location between its forward and aft ends to a portion of said first link means shiftable relative to said beam, and second link means having two links pivotally connected to said carrier member at locations fore and aft, respectively, of said pivotal connection between said carrier member and said first link means, portions of said two links being swingable relative to said carrier member, said swingable portions of said two links being pivotally connected to the flap, and control means connecting said carrier member to the wing for shifting said carrier member relative to the wing.

2. The mounting mechanism defined in claim 1, in which the control means includes a control member movable through one range primarily to effect movement of the carrier member fore and aft relative to the wing for effecting chordwise movement of the flap relative to the wing, and said control member being movable through another range for effecting primarily tilting of the carrier member relative to the first link means for primarily altering the angle of incidence of the flap relative to the wing.

3. The mounting mechanism defined in claim 1, and means for effecting swinging of the carrier member relative to the first link means for altering the angle of incidence of the flap relative to the wing.

4. Mounting mechanism for an airplane wing trailing-edge dual section flap including a forward flap section and a rear flap section, comprising supporting means supporting the forward flap section from the wing for movement relative to the wing, and motion-amplifying compound linkage supporting the rear flap section from the forward flap section for movement relative thereto, guiding the rear flap section for rearward translation relative to the forward flap section over a substantial distance and including first link means having two first generally parallel links pivotally mounted on independent pivots, respectively, on the forward flap section and spaced chordwise of the forward flap section and second link means having two second links pivoted on and carried directly by said two first links, respectively, said two second links being spaced chordwise of the rear flap section and pivotally connected, respectively, to two chordwise spaced portions of the rear flap section.

5. The mounting mechanism defined in claim 4, and control means connecting the first link means and the forward flap section supporting means for swinging the first link means relative to the forward flap section in response to movement of the forward flap section relative to the forward flap section supporting means, thereby to move the rear flap section relative to the forward flap section.

6. The mounting mechanism defined in claim 4, and control means connecting the first link means and the forward flap section supporting means for effecting swinging of the first link means relative to the forward flap section by movement of said control means relative to the forward flap section, thereby to move the rear flap section relative to the forward flap section.

7. The mounting mechanism defined in claim 4 the supporting means including third link means carrying the forward flap section, and control means connecting the first link means and the third link means for coordinating swinging of the first link means relative to the forward flap section, thereby to move the rear flap section relative to the forward flap section corresponding to swinging of said third link means relative to the forward flap section during movement of the forward flap section relative to the wing.

8. The mounting mechanism defined in claim 4, and coordinating means separate from the rear flap section and connecting the second link means and the first link means for effecting swinging of the second link means relative to the first link means coordinated with swinging of the first link means relative to the forward flap section.

9. The mounting mechanism defined in claim 4, and means for effecting tilting of the forward flap section and the rearward flap section conjointly relative to the wing.

10. Mounting mechanism for an airplane wing trailing-edge flap comprising a portion of the wing located beneath the flap; a carrier member elongated fore and aft of the wing and located below the flap; two first links pivotally connected to the wing and to said carrier member and swingable to guide said carrier member for lengthwise bodily displacement chordwise relative to the wing, one of said first links having a portion projecting upward beyond the upper side of said carrier member; a pivot on said portion of the wing below the flap, stationary relative thereto and pivotally connecting said upward projecting portion of said one of said first links and said portion of the wing below the flap; and two second generally parallel links separate from said two first links, pivotally connected to said carrier member and having portions thereof projecting upward from said carrier member, swingable relative to said carrier member and pivotally connected to the flap for guiding the flap for movement chordwise of the wing relative to said carrier member.

11. The mounting mechanism defined in claim 10, and control means connecting the wing and the carrier member for effecting movement of the carrier member fore and aft relative to the wing.

12. Mounting mechanism for an airplane wing trailing-edge flap, comprising a projection fixedly mounted to the wing, extending rearwardly from the wing and having a portion thereof beneath the flap, first link means pivotally connected to said portion of said projection beneath the flap, a carrier member pivotally connected to a swinging portion of said first link means remote from said projection and supported thereby from said projection for movement chordwise of the wing relative to said projection, second link means separate from said first link means, pivotally mounted on said carrier member and having a portion thereof swingable relative to said carrier member, said swingable portion of said second link means being pivotally connected to the flap for guiding the flap for translation chordwise of the wing relative to said carrier member with its chord generally parallel to the chord of the wing, and means for effecting swinging of said second link means relative to said carrier member always in the rotative sense opposite swinging of said first link means relative to said carrier member.

13. The mounting mechanism defined in claim 12, in which the carrier member is elongated and the second link means includes two links pivotally connected to the carrier member at locations spaced lengthwise thereof and the first link means includes a link connected to the carrier member at a location generally centrally between the connections of said two links of the second link means to the carrier member.

14. Mounting mechanism for an airplane wing trailing-edge flap, comprising a projection fixedly mounted to the wing, extending rearwardly from the wing and having a portion thereof beneath the flap, two links pivotally connected to and depending from the wing and swingable in generally parallel relationship through a substantial angle, a carrier member having a portion thereof located beneath the flap, pivotally connected to swinging portions of said links and guided thereby for translation chordwise of the wing, one of said links having one end pivotally connected to said portion of said projection beneath the flap and the other end pivotally connected to said carrier member, and link means extending upward from said carrier member to the flap, pivotally mounted on said carrier member and having a portion thereof swingable relative to said carrier member, said swingable portion of said link means being pivotally connected to the flap for guiding the flap for translation chordwise of the wing relative to said carrier member.

15. Mounting mechanism for an airplane wing trailing-edge flap including a forward flap section and a rear flap section, such mechanism comprising a projection fixedly mounted to the wing, extending rearwardly from the wing and having a portion thereof beneath the forward flap section, first motion-amplifying compound linkage including first link means having the upper portion of said first link means pivotally connected to said portion of said projection beneath the flap, second link means pivotally connected to said first link means at a location remote from said projection and pivotally connected to the forward flap section for guiding the forward flap section for translation chordwise of the wing, the forward flap section having a second projection fixedly mounted to the forward flap section, projecting rearwardly therefrom and having a portion thereof extending beneath the rear flap section, and second motion-amplifying compound linkage including third link means pivotally connected to the portion of said second projection beneath the rear flap section and fourth link means pivotally connected to said third link means at a location remote from said second projection, the rear flap section being pivotally connected to said fourth link means for guiding the rear flap section for translation through a substantial distance chordwise relative to the forward flap section.

16. Mounting mechanism for an airplane wing trailing-edge flap, comprising a projection extending rearwardly from the wing and having a portion thereof beneath the flap, first link means pivotally connected to said portion of said projection beneath the flap, an elongated carrier member pivotally connected to a swinging portion of said first link means and guided thereby for translation chordwise of the wing, second link means separate from said first link means and having a portion thereof swingable relative to said carrier member, said second link means including two links pivotally connected to said carrier member at locations spaced lengthwise thereof and said first link means including a link connected to said carrier member at a location generally centrally between the connections of said two links of said second link means to said carrier member, said swingable portion of said second link means being pivotally connected to the flap for guiding the flap for translation chordwise of the wing relative to said carrier member with its chord generally parallel to the chord of the wing, and means for effecting swinging of said second link means relative to said carrier member always in the rotative sense opposite swinging of said first link means relative to said carrier member.

17. Mounting mechanism for an airplane wing trailing-edge dual section flap including a forward flap section supported from the wing for chordwise translation and a rear flap section, comprising motion-amplifying compound linkage supporting the rear flap section from the forward flap section for movement relative thereto and including two first substantially parallel links pivotally mounted on independent pivots, respectively, on the forward flap section, carrier link means pivotally connecting respective swinging portions of said two first links, two second links pivoted to said carrier link means, spaced chordwise of the rear flap section and carrying the rear flap section for chordwise translation relative to the forward flap section, a third link connected between the forward flap section and the airplane wing, and control means connecting one of said first links and said third link for coordinating swinging of said first links relative to the forward flap section, thereby to move the rear flap section relative to the forward flap section corresponding to swinging of said third link relative to the forward flap section during translation of the forward flap section relative to the wing.

* * * * *

UNITED STATES PATENT AND TRADEMARK OFFICE
CERTIFICATE OF CORRECTION

PATENT NO. : 4,248,395
DATED : February 3, 1981
INVENTOR(S) : James B. Cole

It is certified that error appears in the above-identified patent and that said Letters Patent are hereby corrected as shown below:

Title page, [63] Related U.S. Application Data, cancel "780,711" and insert ---780,771---.

Column 10, line 29, insert a comma after "4".

Signed and Sealed this

Twelfth Day of May 1981

[SEAL]

Attest:

RENE D. TEGTMEYER

Attesting Officer     Acting Commissioner of Patents and Trademarks